H. Killam,

Making Carriage Wheels,

No. 4070. Reissued July 12, 1870.

Witnesses:

G. J. Tibbits,

John H. Shumway.

Inventor:

Henry Killam.

By his Attorneys.

Munn & Co.

N. PETERS, PHOTO-LITHOGRAPHER, WASHINGTON, D. C.

United States Patent Office.

HENRY KILLAM, OF NEW HAVEN, CONNECTICUT.

*Letters Patent No.* 69,818, *dated October* 15, 1867; *reissue No.* 4,070, *dated July* 12, 1870.

IMPROVEMENT IN MACHINE FOR COMPRESSING CARRIAGE-WHEELS.

The Schedule referred to in these Letters Patent and making part of the same.

*To all whom it may concern:*

Be it known that I, HENRY KILLAM, of New Haven, in the county of New Haven and State of Connecticut, have invented a new Improvement in Machine for Compressing Carriage-Wheels; and I do hereby declare the following, when taken in connection with the accompanying drawing and the letters of reference marked thereon, to be a full, clear, and exact description of the same, and which said drawing constitutes part of this specification, and represent in—

Figure 1:
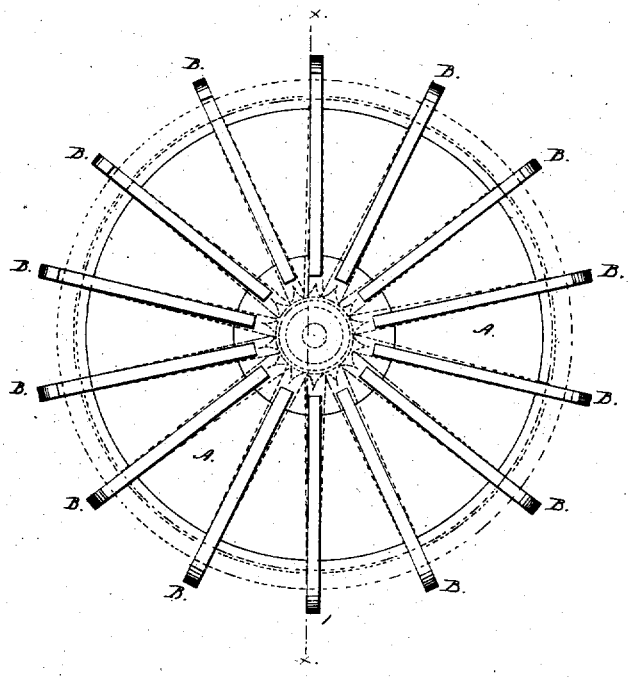

Figure 1 a top view, and in

Figure 2:
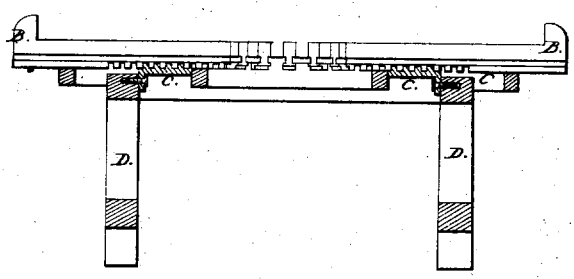

Figure 2 a vertical central section, on line *x x*.

This invention relates to an improvement in the manufacture of carriage-wheels; and consists in an apparatus for compressing the felly onto the spokes preparatory to receiving the tire, its object being to bring the felly to a solid bearing upon all the spokes, and to compress the whole wheel tightly together in all its parts.

Various devices have been used to accomplish this object, the most successful being that of a screw arranged to compress against the felly at each spoke, like an ordinary vise or clamp, as see the patent of George Cook, July 21, 1863.

A is a plate or frame, as the case may be, constructed with radial grooves or guides to receive jaws B B, more or less in number, should correspond to the number of spokes.

Upon the under side of the said jaws are formed teeth, as seen in fig. 2, and beneath the frame or plate A, which supports the jaws, is arranged another plate, C, having a spiral groove or thread formed thereon, corresponding to the teeth upon the under side of the jaws, the said plate C being fixed to any convenient frame-work, D, or other arrangement that will hold the said plate firm and strong in any fixed position, while the plate or frame A is constructed and arranged so as to turn freely and centrally upon the plate C.

By the turning of the frame or plate A upon the plate C, the jaws B are turned with the plate A, and the teeth on the said jaws, following in the spiral groove upon the fixed plate C, are forced from or drawn toward the center, according to the direction in which they are turned, and the said plate or frame A and jaws B are so turned in any convenient manner.

In fig. 1, a wheel is represented in red, as placed upon the machine preparatory to compressing, the jaws having first been extended, so as to permit the wheel to lie within their grasp, and, when so placed, turn the plate A in the direction to draw the jaws firmly against the periphery of the wheel. If, then, the felly be too long, saw the joints in the usual manner, and again turn up the jaws until all parts of the wheel are firmly compressed together.

I have thus far described my machine as compressing upon the outside of the felly; it will, however, be evident to persons skilled in the art that the same apparatus may be employed for compressing the spokes into the hub, where it is desirable so to do before putting on the felly.

By such compression only can a durable wheel be produced; and, as such compression is necessary, it is desirable that it should be equal at all points, and this can only be insured by jaws which move simultaneously; hence, one great advantage which my invention has over other devices for this purpose. Another great advantage is the saving of time in so simultaneously moving all the jaws.

I claim as my invention—

The combination and arrangement of the radial jaws, as described, so that an equal and simultaneous movement is given to all the jaws, substantially as set forth, and for the purpose specified.

HENRY KILLAM.

Witnesses:

A. J. TIBBITS,

J. H. SHUMWAY.